US008783609B2

(12) United States Patent
Schneider et al.

(10) Patent No.: US 8,783,609 B2
(45) Date of Patent: Jul. 22, 2014

(54) MOVABLE BIN

(75) Inventors: Uwe Schneider, Jork (DE); Bengt Abel, Hamburg (DE); Peter Bielik, Hamburg (DE); Raj Kotian, Hamburg (DE)

(73) Assignee: Airbus Operations GmbH (DE)

( * ) Notice: Subject to any disclaimer, the term of this patent is extended or adjusted under 35 U.S.C. 154(b) by 94 days.

(21) Appl. No.: 13/526,862

(22) Filed: Jun. 19, 2012

(65) Prior Publication Data

US 2012/0318917 A1  Dec. 20, 2012

Related U.S. Application Data

(60) Provisional application No. 61/498,700, filed on Jun. 20, 2011.

(30) Foreign Application Priority Data

Jun. 20, 2011 (DE) .......................... 10 2011 105 005

(51) Int. Cl.
*B64D 11/00* (2006.01)
(52) U.S. Cl.
USPC .................. 244/118.5; 244/118.1; 244/118.6; 312/245
(58) Field of Classification Search
USPC ............. 244/118.5, 118.6, 118.1, 119, 117 R
See application file for complete search history.

(56) References Cited

U.S. PATENT DOCUMENTS

| | | | | |
|---|---|---|---|---|
| 3,598,273 A | * | 8/1971 | Rau et al. ........................ 220/1.5 |
| 4,951,560 A | * | 8/1990 | Setan ............................. 105/340 |
| 5,549,258 A | * | 8/1996 | Hart et al. .................. 244/118.1 |
| 5,820,076 A | * | 10/1998 | Schumacher et al. ..... 244/118.5 |
| 6,290,175 B1 | * | 9/2001 | Hart et al. .................. 244/118.5 |
| 6,318,671 B1 | * | 11/2001 | Schumacher et al. ..... 244/118.5 |
| 7,922,119 B2 | * | 4/2011 | Muin et al. ................. 244/118.5 |
| 8,262,022 B2 | * | 9/2012 | Young et al. ............... 244/118.5 |
| 8,430,358 B2 | * | 4/2013 | Schneider et al. ......... 244/118.5 |
| 8,474,755 B2 | * | 7/2013 | Schneider .................. 244/118.5 |
| 8,480,029 B2 | * | 7/2013 | Young et al. ............... 244/118.5 |
| 2001/0011692 A1 | * | 8/2001 | Sprenger et al. ........... 244/118.5 |

(Continued)

FOREIGN PATENT DOCUMENTS

| DE | 4228260 | 3/1994 |
|---|---|---|
| DE | 19540929 A1 | 5/1997 |

(Continued)

*Primary Examiner* — Christopher P Ellis
*Assistant Examiner* — Medhat Badawi
(74) *Attorney, Agent, or Firm* — Lerner, David, Littenberg, Krumholz & Mentlik, LLP

(57) ABSTRACT

A movable storage compartment for a passenger cabin comprises a housing and fixing structures on the side walls of the housing, the housing being open on one side and being able to be moved back and forth between an open and a closed position, that is to say being able to be opened and closed. The fixing structures are formed in such a way that during a movement from the open position to the closed position the housing can be moved first predominantly rotationally and then predominantly translationally upwards.

10 Claims, 3 Drawing Sheets

(56) References Cited

U.S. PATENT DOCUMENTS

| | | |
|---|---|---|
| 2007/0152480 A1 | 7/2007 | Muin et al. |
| 2007/0164155 A1* | 7/2007 | Muin et al. ............... 244/118.5 |
| 2008/0078871 A1* | 4/2008 | Munson et al. ............ 244/118.5 |
| 2011/0133029 A1* | 6/2011 | Berkenhoff et al. ....... 244/118.5 |
| 2011/0139929 A1* | 6/2011 | Young et al. ............... 244/118.5 |
| 2011/0186681 A1* | 8/2011 | Vine et al. ................. 244/118.5 |
| 2011/0192935 A1* | 8/2011 | Schneider et al. ......... 244/118.5 |
| 2011/0240796 A1* | 10/2011 | Schneider .................. 244/118.5 |
| 2012/0012707 A1* | 1/2012 | Schliwa et al. ............ 244/118.5 |
| 2012/0228425 A1* | 9/2012 | Schneider et al. ......... 244/118.5 |
| 2012/0228426 A1* | 9/2012 | Schneider et al. ......... 244/118.5 |
| 2012/0325963 A1* | 12/2012 | Young et al. ............... 244/118.5 |
| 2013/0026293 A1* | 1/2013 | Schneider et al. ......... 244/118.5 |

FOREIGN PATENT DOCUMENTS

| | | |
|---|---|---|
| DE | 19800588 A1 | 7/1999 |
| DE | 10063932 A1 | 7/2002 |
| DE | 102006048998 | 7/2007 |
| DE | 102007030331 A1 | 1/2009 |
| DE | 102008025232 A1 | 12/2009 |
| DE | 102008051240 B3 | 9/2010 |
| DE | 102009057014 A1 | 6/2011 |
| EP | 0225812 | 6/1987 |
| EP | 0899192 A2 | 3/1999 |
| EP | 1 116 651 A2 | 7/2001 |
| FR | 2879087 | 6/2006 |
| WO | 8202821 A1 | 9/1982 |
| WO | 2009003945 A1 | 1/2009 |

* cited by examiner

MOVABLE BIN

CROSS-REFERENCE TO RELATED APPLICATIONS

This application claims the benefit of the filing date of German Patent Application No. 10 2011 105 005.5 filed Jun. 20, 2011 and of U.S. Provisional Patent Application No. 61/498,700 filed Jun. 20, 2011, the disclosures of which applications are hereby incorporated herein by reference.

FIELD OF THE INVENTION

The invention relates to a movable storage compartment for a passenger cabin of, for example, an aircraft. The invention relates in particular to an upwardly movable storage compartment. The invention also relates to the use of a storage compartment of this type in an aircraft.

BACKGROUND OF THE INVENTION

There are currently two different luggage storage systems for aircraft cabins. There are stationary luggage bins (fixed bins) in the form of a storage compartment provided with a cover flap on the passenger side. Alternatively, there are pivotable luggage bins (movable bins) in the form of a storage compartment which is pivotable on the passenger side and does not have a cover flap. All luggage bins of which the loading edge can be moved in any manner are referred to as movable bins. A fundamental aspect of a movable storage compartment is that the open loading position differs from the closed position.

Common to the two variants is the fact that, particularly for the central region (middle hatrack), it is difficult to reach a compromise between advantageous loading height and comfortable headroom.

An example of a movable bin which is preinstalled in a housing box as a storage compartment module can be found in DE 10 2007 030331 A1 and WO 2009/003945 A1.

BRIEF SUMMARY OF THE INVENTION

An aspect of the invention provides a storage compartment which achieves a good compromise between loading height and headroom. Another aspect of the invention provides a storage compartment, the fixing structure of which has low-complexity kinematics.

By means of the combination of two fixing elements at the chute, one being a rotational element and one being a translational element, a very simple construction can be achieved using standard industry components.

This combination allows the following effects and optional functionalities:

- a good loading possibility by means of translation towards the passenger
- a good integration of the storage compartment into a cabin design by means of rotation into a closed end position (continuous lining)
- a reduced manual force required to move the storage compartment, owing to a moving centre of rotation
- a fully-automated closure can take place by means of a linear drive having an electrically driven spindle
- a linear drive having an electrically driven spindle allows power feedback and power storage in the aircraft power system during opening (electric drive is used as a generator)
- a damper can be integrated into the linear drive (additional dampers dispensed with)
- in powerless states of an aircraft, the linear drive can easily be moved/overridden by manual force.

In general, a movable storage compartment for a passenger cabin according to the invention comprises a housing and fixing structures on the side walls of the housing, the housing being open on one side and being able to be moved back and forth between an open and a closed position, that is to say being able to be opened and closed. The fixing structures are formed in such a way that, when moving from the open position to the closed position, the housing can be moved first rotationally and then translationally upwards.

It is noted that the rotatory movement also includes a predominantly rotatory movement. That is to say that the actual movement can comprise a plurality of movement components, in such a way that the housing does not pivot exclusively about a pivot axis from the open position, but rather also simultaneously carries out a further movement such as a translatory movement. As the movement progresses, that is to say towards the closed position, the translatory movement component predominates, although there may still be a simultaneous minor rotatory movement.

According to an embodiment of the invention, the fixing structures comprise a pivot arm and a linear guide means. It is noted that one pivot arm and one linear guide means can conventionally be provided on each of the two side walls of the storage compartment housing.

Owing to the fixing structures according to the invention, the following processes can take place during the closure. The closure is initiated by a rotation about a centre of rotation close to the centre of gravity on the pivot arm, the system being statically fixed by a second pivot point on the linear guide means. During the further closure along the linear guide means, the rotational movement transitions into a translational movement, this translational movement being able to extend obliquely upwards at approximately 45°, that is to say obliquely upwards in a range between 35° and 55°. In the closed end position, a continuous lining can be achieved, that is to say the storage compartment disappears inconspicuously in the ceiling lining and produces no hard contour, in contrast to a fixed bin solution.

According to another embodiment of the invention, the fixing structures also comprise an electric drive for driving the linear guide means. For example, the linear guide means can comprise a spindle drive which has a spindle and a spindle nut, the electric drive being connected to the spindle, in order to drive it. The spindle nut can serve as a pivot point for the housing of the storage compartment, in such a way that the housing can be moved along the linear guide means when the spindle is arranged on a rigid structure such as a receiving space for the storage compartment. The electric drive which acts via the spindle is used for power assistance during closure.

It is noted that the linear guide means can also be arranged in such a way that the spindle is arranged on the storage compartment housing and the pivot point is, for example, arranged on a wall of the receiving space for the storage compartment.

According to a further embodiment of the invention, the electric drive can be used as a generator, in such a way that when the storage compartment housing is opened, that is to say when the storage compartment housing moves downwards, electricity is produced, which can either be supplied to a general electricity supply, or stored, in order to be used again subsequently for driving the storage compartment housing during a closure movement.

According to another embodiment, the fixing structures comprise a damper to damp movements of the housing. The damper can be integrated into the linear guide means or the damper can be provided by a corresponding control system of the electric drive. Alternatively, the linear guide means can comprise a rotation damper which acts via an integrated spindle to provide a defined movement speed during opening. The damper can also be a separate element which is fixed at a suitable place on the housing of the storage compartment.

In this context, it is noted that the damper can also be formed as a spring damper, in such a way that during a downward movement (opening), energy can be absorbed by a spring, which energy can then be released again during an upward movement (closure), whereby damping of the downward movement and power assistance for the upward movement can be provided.

According to a further embodiment of the invention, the fixing structures comprise an element for locking the housing in the closed position. The primary function of an element of this type is to prevent unintentional opening of the storage compartment body. The element can either be formed as a locking latch which engages in a corresponding recess in a side wall of a receiving space for the storage compartment, if the locking latch is arranged laterally on the storage compartment body, or the element can engage directly in a recess in the frame of the aircraft structure, if the element is arranged on a rear side or a lateral edge of the rear side of the storage compartment body.

The housing can be produced from a glass-fibre-reinforced or carbon-fibre-reinforced material.

A handle can also be integrated into the housing wall which is visible in the closed position. Preferably, the visible wall of the housing can be integrated into a lining of an interior of, for example, an aircraft.

According to an embodiment of the invention, the storage compartment can be used in a passenger cabin of an aircraft or a vehicle.

According to a further embodiment of the invention, an aircraft comprises a storage compartment having the above-described features. The aircraft can also comprise a lining panel which is arranged above the storage compartment in the passenger cabin of the aircraft. At its lower edge, the lining panel can comprise a portion which extends in the direction of the aircraft structure. This portion of the lining panel cannot be seen from the passenger cabin and can be configured in such a way that the storage compartment body, in the closed state, forms a closed box together with this portion. This prevents, for example, objects which are located in the storage compartment body from engaging the lining panel from behind.

The above-described aspects and further aspects, features and advantages of the invention can also be derived from the examples of the embodiments, which are described below with reference to the appended drawings.

DETAILED DESCRIPTION

Figure 1:
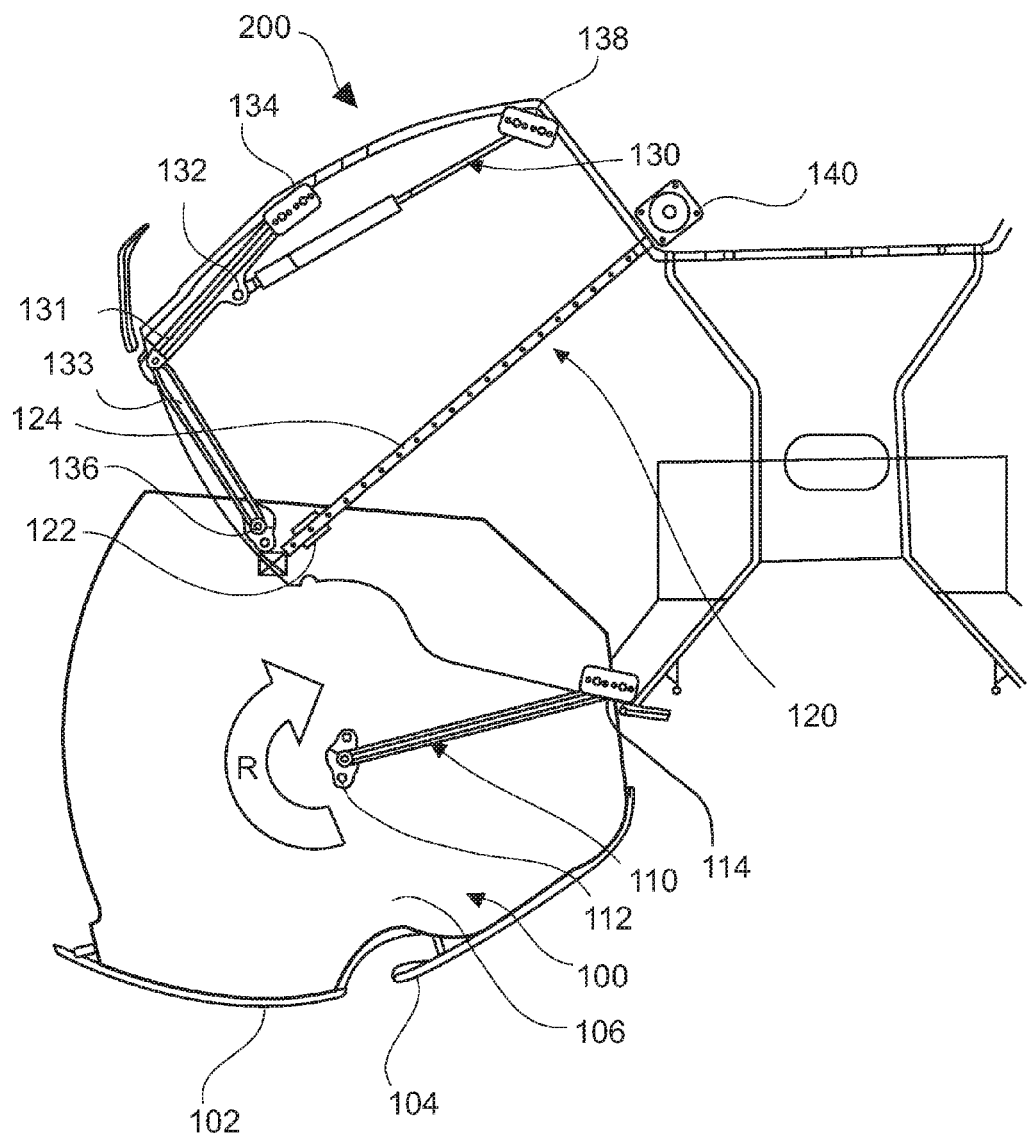
FIG. 1 is a schematic side view of a storage compartment according to the invention in an open position.
Figure 2:
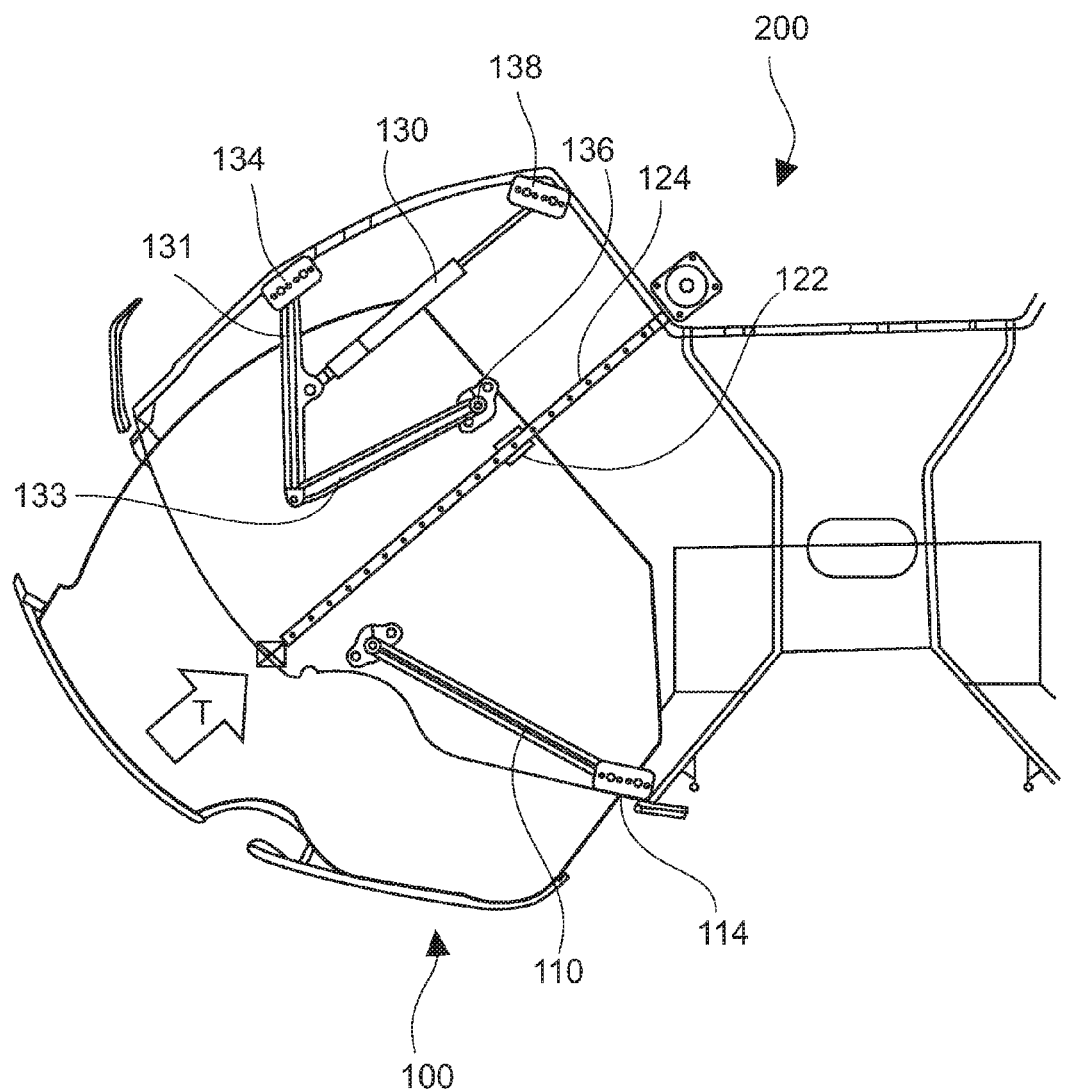
FIG. 2 is a schematic side view of the storage compartment according to the invention in an intermediate position.
Figure 3:
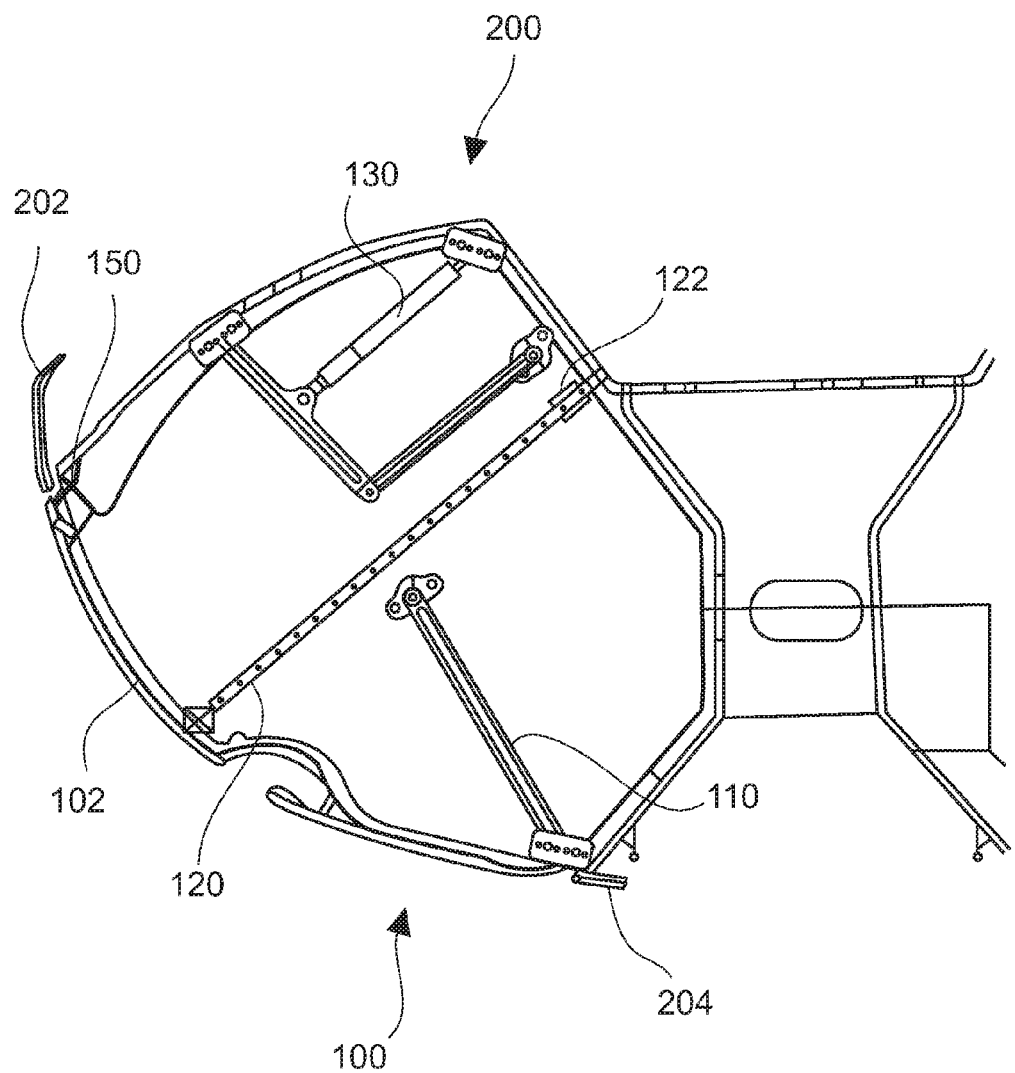
FIG. 3 is a schematic side view of the storage compartment according to the invention in a closed position.

FIG. 1 to 3 are side views of a storage compartment according to an embodiment of the invention, a movement sequence from an open position (FIG. 1) to a closed position (FIG. 3), via a middle intermediate position (FIG. 2), being illustrated.

FIG. 1 shows a storage compartment having a housing 100 and fixing structures, together with a receiving space 200 for the storage compartment. The housing 100 comprises a wall 102, into which a handle structure 104 is integrated. The housing 100 also comprises a first side wall 106, and a second side wall (not shown), to which the fixing structures are attached. The housing 100 is open on one side, the housing 100 in the figures being open on the left side.

The fixing structures comprise a pivot arm 110, a linear guide means 120 and a damper 130. A first end 112 of the pivot arm 110 is fixed to the side wall 106 of the housing and the second end 114 of the pivot arm can be fixed to a bearing structure of the receiving space 200 for the storage compartment. In this manner, the housing can be rotated about a pivot axis near the centre of gravity. The linear guide means 120 can be formed as a spindle drive having a guide rail 124, a spindle and a spindle nut, which drive is mounted on the housing of the storage compartment and, for example, on a wall of the receiving space for the storage compartment. As can be seen in the figures, a fixing point 122 is arranged on the spindle nut, near a back wall of the housing 100. The guide rail 124 extends at an angle of approximately 45° obliquely upwards into the receiving space for the storage compartment.

In FIG. 1, an electric drive 140 is shown schematically at the upper end of the linear guide means 120. The electric drive can be connected to the spindle in the linear guide means, and the spindle nut, and thus the housing, can be actively pulled upwards along the linear guide means via the driven spindle.

FIG. 1 also shows a damper 130, which is connected to the housing 100 via a coupling joint. The coupling joint comprises a first coupling member 131 and a second coupling member 133, which are connected to each other via a joint. The first coupling member 131 is connected to the bearing structure of the receiving space 200 for the storage compartment via a first pivot point 134, and the second coupling member 133 is connected to the housing 100 of the storage compartment via a second pivot point 136. One end 132 of the damper 130 is connected to the first coupling member 131, approximately in the centre thereof, and the other end 138 is in turn connected to the bearing structure of the receiving space for the storage compartment.

Finally, FIG. 1 shows an arrow R, which denotes a starting movement of the housing 100 about a pivot axis, for the case in which the housing is to be closed from an open position. That is to say, the arrow R illustrates a rotatory movement at the beginning of a closing movement.

The elements of the storage compartment according to the invention are also shown in FIG. 2, but in a position between the open position and a closed position. It can be seen in FIG. 2 that the fixing point at the second end 114 of the pivot arm 110, the pivot point 134 of the first coupling member 131, the fixing point at the second end 138 of the damper 130 and the guide rail 124 of the linear guide means 120 are fixed points which do not change position. In contrast thereto, the pivot arm 110, the coupling members 131 and 133 and the fixing point 122 on the spindle nut do change position.

The arrow T in FIG. 2 denotes a translatory movement which extends in the direction of the linear guide means 120 and which prevails in the second half of the closure movement.

FIG. 3 shows the storage compartment in a closed position, that is to say in a position in which the housing 100 of the storage compartment is received completely in the receiving space 200 for the storage compartment. It can be seen in FIG. 3 that the wall 102 of the housing 100 is configured in such a way that a closed lining is produced together with the lining parts 202 and 204 when the storage compartment is in the closed position. FIG. 3 also shows that a catch 150 can be provided, which can prevent unintentional opening of the storage compartment. The catch is shown schematically at an upper edge of the wall 102, and can engage in a corresponding structure on the lining part 202, in order to lock the storage compartment in the closed position.

While the invention has been illustrated and described in detail in the drawings and the preceding description, illustrations and descriptions of this type are intended to be merely illustrative or exemplary and not restrictive, and the invention is therefore not limited by the disclosed embodiments. Other variations of the disclosed embodiments can be understood by a person skilled in the art when implementing the claimed invention, and can be produced by studying the drawings, the disclosure and the appended claims.

In the claims, the word "comprising" does not exclude other elements or steps and the indefinite article "a" does not exclude a plurality.

Merely the fact that certain features are referred to in different dependent claims does not limit the subject-matter of the invention. Any combinations of these features can also advantageously be used. The reference numerals in the claims should not restrict the scope of the claims.

List of Reference Numerals
100 storage compartment
102 wall
104 handle structure
106 side wall
110 pivot arm
112 first end of the pivot arm
114 second end of the pivot arm
120 linear guide means
122 fixing point
124 guide rail
130 damper
131 first coupling member
132 first end of the damper
133 second coupling member
134 first pivot point
136 second pivot point
138 second end of the damper
140 electric drive
150 catch
200 receiving space for the storage compartment
202, 204 lining parts

The invention claimed is:

1. A storage compartment for a passenger cabin, comprising:
 a housing open on a first side and comprising first and second side walls, the housing having a center of gravity and
 a plurality of fixing structures connected to the housing at the first and second side walls of the housing,
 wherein the plurality of fixing structures are formed such that the housing is configured to move first rotationally about a pivot axis near the center of gravity of the housing and then to move translationally upwards from an open position to a closed position.

2. The storage compartment according to claim 1, wherein the plurality of fixing structures comprise a pivot arm and a linear guide.

3. The storage compartment according to claim 2, wherein the linear guide comprises an electric drive and an integrated spindle for power assistance during closure.

4. The storage compartment according to claim 3, wherein the electric drive is configured to feed power back into the system as a generator during opening.

5. The storage compartment according to claim 2, wherein the linear guide comprises a rotation damper and an integrated spindle, for defined movement speed during opening.

6. The storage compartment according to claim 1, wherein the housing is configured to be moved translationally at an angle between 35° and 55°.

7. The storage compartment according to claim 1, wherein the plurality of fixing structures comprise a damper for damping movements of the housing.

8. The storage compartment according to claim 1, wherein the plurality of fixing structures comprise an element for locking the housing in the closed position.

9. The storage compartment according to claim 1, wherein the housing is produced from a glass-fibre-reinforced or a carbon-fibre-reinforced material.

10. The storage compartment according to claim 1, wherein a wall of the housing, which wall is visible in the closed position, is formed such that a handle structure is integrated into the wall and the wall is configured to be integrated into the lining of the interior of an aircraft.

\* \* \* \* \*